(12) United States Patent
Chhabra et al.

(10) Patent No.: US 10,996,980 B2
(45) Date of Patent: May 4, 2021

(54) MULTI-THREADED COMMAND PROCESSING SYSTEM

(71) Applicant: Avago Technologies International Sales PTE. Limited, Singapore (SG)

(72) Inventors: Lalit Chhabra, Fremont, CA (US); Gregorio Gervasio, Jr., Santa Clara, CA (US); Kenny Wu, Saratoga, CA (US); Mark Karnowski, Huntington Beach, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 323 days.

(21) Appl. No.: 15/960,251

(22) Filed: Apr. 23, 2018

(65) Prior Publication Data
US 2019/0324800 A1  Oct. 24, 2019

(51) Int. Cl.
*G06F 9/46*  (2006.01)
*G06F 9/48*  (2006.01)

(52) U.S. Cl.
CPC .................. *G06F 9/4881* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 6,434,197 B1 * | 8/2002 | Wang | H04N 21/23655 375/240.03 |
| 6,934,780 B2 | 8/2005 | Modelski et al. | |
| 7,551,575 B1 * | 6/2009 | Aleksandrowicz | H04Q 11/04 370/310.1 |
| 7,627,736 B2 | 12/2009 | Stuttard et al. | |
| 7,937,567 B1 * | 5/2011 | Nickolls | G06F 9/30072 712/22 |
| 8,762,581 B2 | 6/2014 | Modelski et al. | |
| 2002/0078267 A1 * | 6/2002 | Rozario | G06F 3/0674 710/22 |
| 2011/0222552 A1 | 9/2011 | Mital et al. | |
| 2012/0173847 A1 * | 7/2012 | Moy | G06F 9/5083 712/32 |
| 2015/0016457 A1 * | 1/2015 | Patel | H04L 49/20 370/392 |
| 2017/0293765 A1 * | 10/2017 | Kang | G06F 9/30007 |

* cited by examiner

*Primary Examiner* — Wissam Rashid
(74) *Attorney, Agent, or Firm* — Morgan, Lewis & Bockius LLP

(57) ABSTRACT

A number of command processing devices, architectures, and methods are described. One example of a command processing device is disclosed to include a classification engine configured to classify input commands, a sequencer in communication with the classification engine, one or more thread managers in communication with the sequencer, and one or more sub-processing engines in communication with each of the one or more thread managers. The sequencer may control staging of work across multiple threads and processing elements within threads. Each of the one or more thread managers are configured to delegate work to different sub-processing engines. Each of the one or more sub-processing engines are configured to perform sub-tasks in connection with completing processing of an input command received at the classification engine based on particular sub-tasks assigned to the one or more sub-processing engines by the one or more thread managers.

20 Claims, 10 Drawing Sheets

MULTI-THREADED COMMAND PROCESSING SYSTEM

FIELD OF THE DISCLOSURE

The present disclosure is generally directed toward data processing and, more specifically, toward a system and method for supporting efficient and flexible data transmission between computing devices.

BACKGROUND

In conventional designs, complex functions like Fibre Channel and Non-Volatile Memory express (NVMe) Protocol Processing are implemented in software running on embedded Central Processing Units (CPUs). These solutions are not easily scalable to current performance requirements, namely higher throughput, lower latency, lower power, and lower cost.

Furthermore, storage protocol (e.g., Fibre Channel) processing is often performed by firmware via embedded CPUs. These embedded CPUs are often referred to as Upper Layer Protocol engines (ULPs). Typically, the processing performance is scaled by increasing the number of ULPs or increasing the operating clock frequency of ULPs. Problematically, increasing the ULP clock frequency may or may not be possible, which is constrained by the current semiconductor process. Additionally problematic is the fact that increasing the number of ULPs will increase the die size and chip cost. In any event, either solution will increase power consumption of the chip.

In addition to the above-noted issues, complex Application-Specific Integrated Circuit (ASIC) designs involve logic that is mostly hardcoded. Other than simple controls via configuration bits, the designs are not very flexible. Thus, after the ASIC is manufactured, it is not amenable to complex changes, for example, changes in functional requirements, or to fix design bugs, or to allow processing by multiple processing elements. In traditional approaches, the flexibility is provided by implementing functions in software running on General Purpose CPUs, which are not very performant.

BRIEF DESCRIPTION OF THE DRAWINGS

The present disclosure is described in conjunction with the appended figures, which are not necessarily drawn to scale.

DETAILED DESCRIPTION

Figure 1:
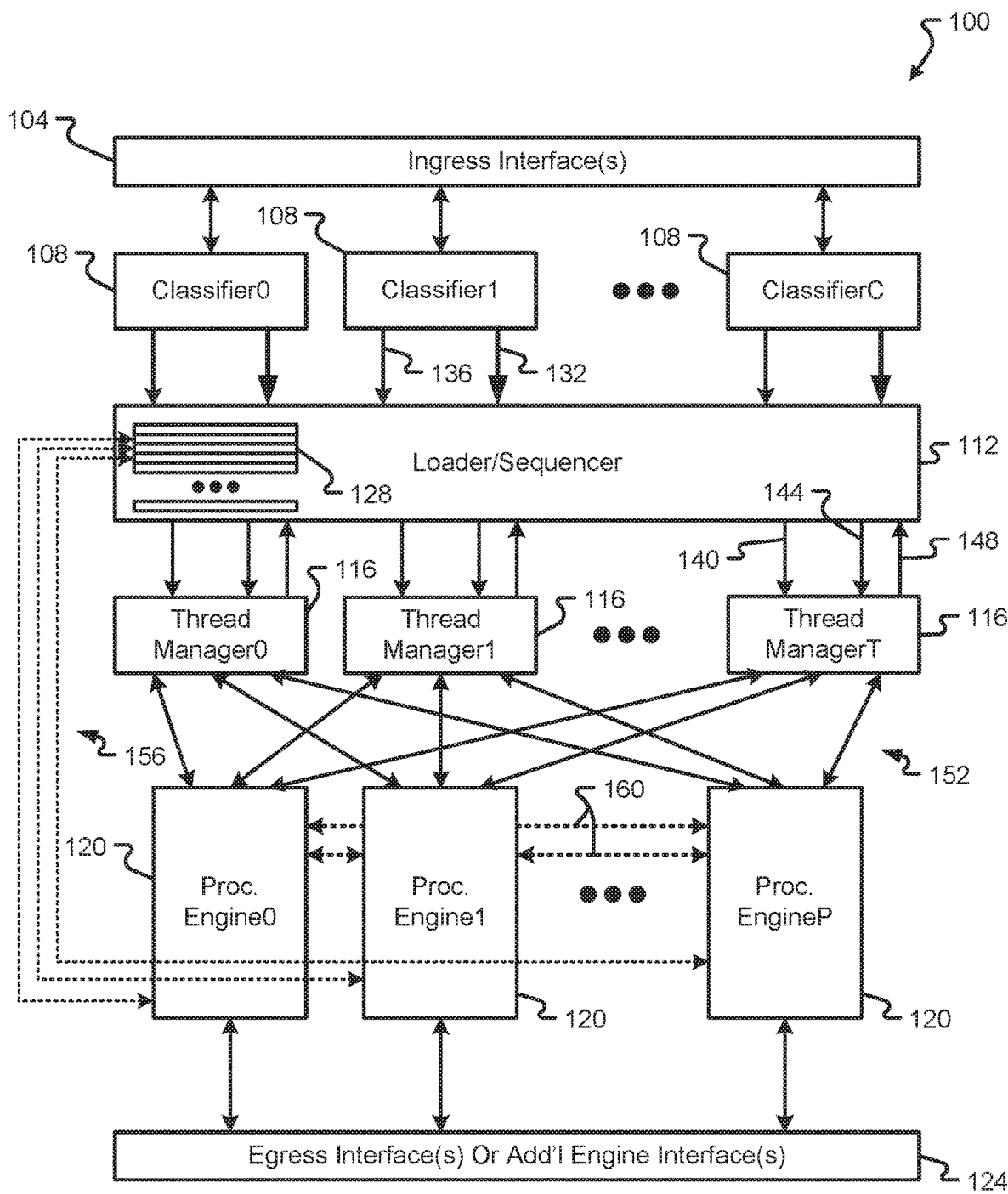
FIG. 1 is a block diagram depicting a first data transmission system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-12, various systems and methods for enabling data processing will be described in accordance with at least some embodiments of the present disclosure. In particular, examples of a high-performance, pipelined, multi-threaded processor with a flexible, out-of-order command processing are disclosed. Embodiments provided herein also disclose a multi-engine protocol offload to maximize data processing performance and flexibility. Embodiments provided herein also disclose performant programmability in processing engines.

Multi-Threaded Processor

With reference now to FIG. 1, additional details of a first command processing system 100 will be described in accordance with at least some embodiments of the present disclosure. The system 100 is shown to include an ingress interface 104 and an egress interface 124 with a plurality of components connected there between. The ingress interface (s) 104 may correspond to one or more physical interfaces to a host device or similar type of processing device. The egress interface(s) 124 may correspond to physical interfaces to a network or may correspond to physical/logical interfaces to additional ingress interface(s) 104 of other systems. Thus, the components depicted in FIG. 1 may be linked to other sub-processors or systems that have similar or identical components to those shown in FIG. 1. In some embodiments, the system 100 may be provided as part of a networking adaptor, a network card, or board within a host device. Alternatively or additionally, components of the system 100 may be provided within a host device. When provided as part of the networking adaptor or host bus adaptor, the system 100 can facilitate the transfer of data between a host device and communication network, or between a packet-based communication network and a host device. Alternatively or additionally, the system 100 may be configured to perform various I/O tasks or commands that are received from a host device, or from a packet-based communication network.

The ingress interface(s) 104 may connect to one or more host devices, which may be provided in the form of a personal computer, a laptop, a server, or any other device that includes a local processor and memory. Alternatively or additionally, the ingress interface(s) 104 may be connected to a packet based communication network, such as an IP-based communication network. The egress interface(s) 124 may provide connectivity to a packet-based communication network, such as an IP-based communication network. Alternatively or additionally, the egress interface(s) 124 may be connected to a host device.

The ingress interface(s) 104 may be in communication with one or more classifiers 108, which provide classification capabilities within the system 100. The classifiers 108 may provide one or multiple outputs to a loader/sequencer 112 that facilitates the loading of commands or processes into various thread managers 116. Each of the thread managers 116 may be in communication with processing engines 120 that are configured to perform the actual processing of tasks or commands (e.g., I/O commands). Outputs of the processing engines 120 may be provided to the egress interface(s) or additional engine interface(s) 124 for further processing by another system 100.

In some embodiments, the processing engines 120 receive input commands from the ingress interface(s) 104. Commands, possibly in the form of I/O commands, processing instructions, read commands, write commands, packets from a communication network, messages from additional engines, etc., when received at the ingress interface(s) 104 are provided to the one or more classifiers 108, which are configured to parse the input commands and create one or more descriptors that will be used to describe the input command to other components of the system 100. Although FIG. 1 depicts the system 100 as having three classifiers 108, it should be appreciated that the system 100 may include a greater or lesser number of classifiers 108 without departing from the scope of the present disclosure. Specifically, the number C of classifiers 108 in the system may be any number that is greater than or equal to one.

Each of the classifiers 108 may provide a command output 132 and descriptor output 136 to a shared loader/sequencer 112. Although not depicted, the loader/sequencer 112 may include one or multiple flow control mechanisms that allow the input commands 132 received from the various classifiers 108 to be throttled. The input commands 132 may be stored in a command storage area 128 until they are fed to a particular one of the thread managers 116. As shown in FIG. 1, the command storage 128 may correspond to a local memory area that facilitates the temporary storage of the commands until they are ready for distribution to the thread managers 116.

Processing of input commands 152 may be split up into one or more pipeline stages among the various thread managers 116. For every pipeline stage, the sequencer 112 may ensure that commands with the same ordering tag are processed serially. Ordering and pipelining can be enforced via start 144 and done 148 event-pairs between the sequencer 112 and thread managers 116, one event-pair for each stage.

Thread managers 116 also receive descriptors 140 and per-stage start signals 144 from the sequencer 112. The thread managers 116 may each be configured to invoke one, some, or any of the processing engines 120 to complete work for the stage. Once completed, a done signal 148 is indicated back to the sequencer 112. Although three thread managers 116 and three processing engines 120 are depicted in FIG. 1, it should be appreciated that the number of thread managers 116 does not have to equal the number of processing engines 120 and the number T of threads 116 and/or the number P of processing engines 120 can be any number that is greater than or equal to one.

In some embodiments, a processing engine 120 receives processing requests in the form of work orders 152 from the thread managers 116. The work orders 152 may correspond to instructions for a processing engine 120 to perform tasks or accomplish parts of a command that has been provided to the thread manager 116. The processing engines 120 may each include the low-level functions needed to complete the work for the command. It should be appreciated that a thread manager 116 may assign some tasks for command completion to one processing engine 120 and other tasks for the same command completion to another (e.g., different) processing engine 120. Thus, the thread manager 116 may be configured to ensure that a command is completely processed, even though such processing may be performed by multiple processing engines 120. When the thread manager 116 has determined that all work orders for a command have been completed (e.g., a command is fully-performed), the thread manager 116 may provide a last done signal 148 to the sequencer 112.

When the sequencer 112 receives the last done signal 148, the sequencer 112 may de-allocate the thread, thereby allowing new input commands to be streamed in from the classifiers 108.

As discussed above, work can be split up into pipeline stages, the progress of which is accomplished/managed by start signals 144 and done signals 148. As an example, a system 100 could be implemented with two processing stages: FETCH and PROCESS. The FETCH stage, once started on a thread manager 116, could be responsible for collecting/fetching all information needed by the command. Once all information is collected, the done signal from the thread manager 116 to the sequencer 112, would indicate the completion of the FETCH stage. Assertion of done 148 allows the FETCH stage to start on the next thread manager 116 with the same ordering tag.

The thread manager 116 may be responsible for invoking one or more processing engines 120 to complete a stage. In this capacity, a thread manager 116 may examine the input command descriptor 140 (corresponding to the descriptor 136 produced at the classifier 108) to determine which processing engine(s) 120 to use, and the sequence in which to invoke the processing engines 120. If a system 100 has T threads and S stages, there are T×S start and done signals 144, 148. The signals tracking S stages between the sequencer 112 and T thread managers 116 can be denoted as:

Consider, for example, a two-stage FETCH/PROCESS engine 100 and assume multiple threads with the same ordering tag are present in the engine. The sequencer 112 ensures that a FETCH stage associated with a thread cannot start until FETCH stages for all previous threads of the same ordering tag are done. Imposing this rule in systems 100 with multiple stage events allows commands with the same ordering tag to be effectively pipelined. Conversely, commands with different ordering tags are not serialized and can be processed out-of-order, thus increasing the performance and throughput of the engine.

In one non-limiting implementation, the sequencer 112 can achieve this by maintaining a two dimensional dependency (dep) vector of S stages×T threads bits per thread (resulting in $T^2 \times S$ bits total across all threads). For a given thread, bit dep[s][t]=1 indicates that stage s of the thread cannot start until the corresponding stage of thread t is done. When a new thread is allocated, all valid threads with the same ordering tag are queried. The dep[s][t] bits of the newly allocated thread are set for thread t if it is not done with stage s. Thus, pending stages for threads with the same ordering tag are captured in this vector, creating a dependency on those threads that arrived before the allocated thread.

In some embodiments, a thread can start processing stage s if its dep[s][*] is 0, which means that all previous threads with the same ordering tag are done with stage s. A done [s][t] signal 148 resets the dep[s][t] bits in all threads with the same ordering tag as the thread indicating done, allowing the stage to start for threads that depend on it. To make the design scalable, the T and S parameters can be specified during design instantiation.

FIG. 1 further shows that command read 156 communications can be shared between the processing engines 120 and command storage 128. Thus, the processing engines 120 can directly retrieve commands from the loader/sequencer 112 once initiated by a thread manager 116. Moreover, the processing engines 120 may be configured to communicate directly with one another via inter-processing communications 160. These additional communication links 160 may allow the processing engines 120 to coordinate their efforts with one another in addition to being coordinated by thread managers 116.

The processing engines 120 may provide the results of their processing efforts (e.g., their outputs) to the egress interface(s) 124 for transmission to other components. Alter-

---

$start0_0, start0_1, start0_2, \ldots start0_S$ : Signals that start work for stages 0, 1, 2, ... S for Thread 0.
$start1_0, start1_1, start1_2, \ldots start1_S$ : Signals that start work for stages 0, 1, 2, ... S for Thread 1.
. . .
. . .
$startT_0, startT_1, startT_2, \ldots startT_S$ : Signals that start work for stages 0, 1, 2, ... S for Thread T.
$done0_0, done0_1, done0_2, \ldots done0_S$ : Signals indicating work done for stages 0, 1, 2, ... S for Thread 0.
$done1_0, done1_1, done1_2, \ldots done1_S$ : Signals indicating work done for stages 0, 1, 2, ... S for Thread1.
. . .
. . .
$doneT_0, doneT_1, doneT_2, \ldots doneT_S$ : Signals indicating work done for stages 0, 1, 2, ... S for Thread T.

---

The sequencer 112 may maintain order across input commands with the same ordering tag by imposing the following rule: For Input Commands with the same ordering tag, the assertion of start signals for any stage S are serialized in the order the Input Commands arrived into the ingress interface 104.

natively, the interface 124 may provide connectivity between the processing engines 120 and additional sub-processing engines, either in the form of more processing engines 120 or in the form of one or more additional systems 100 whose ingress interface 104 receives outputs of the processing engines 120.

Figure 2:
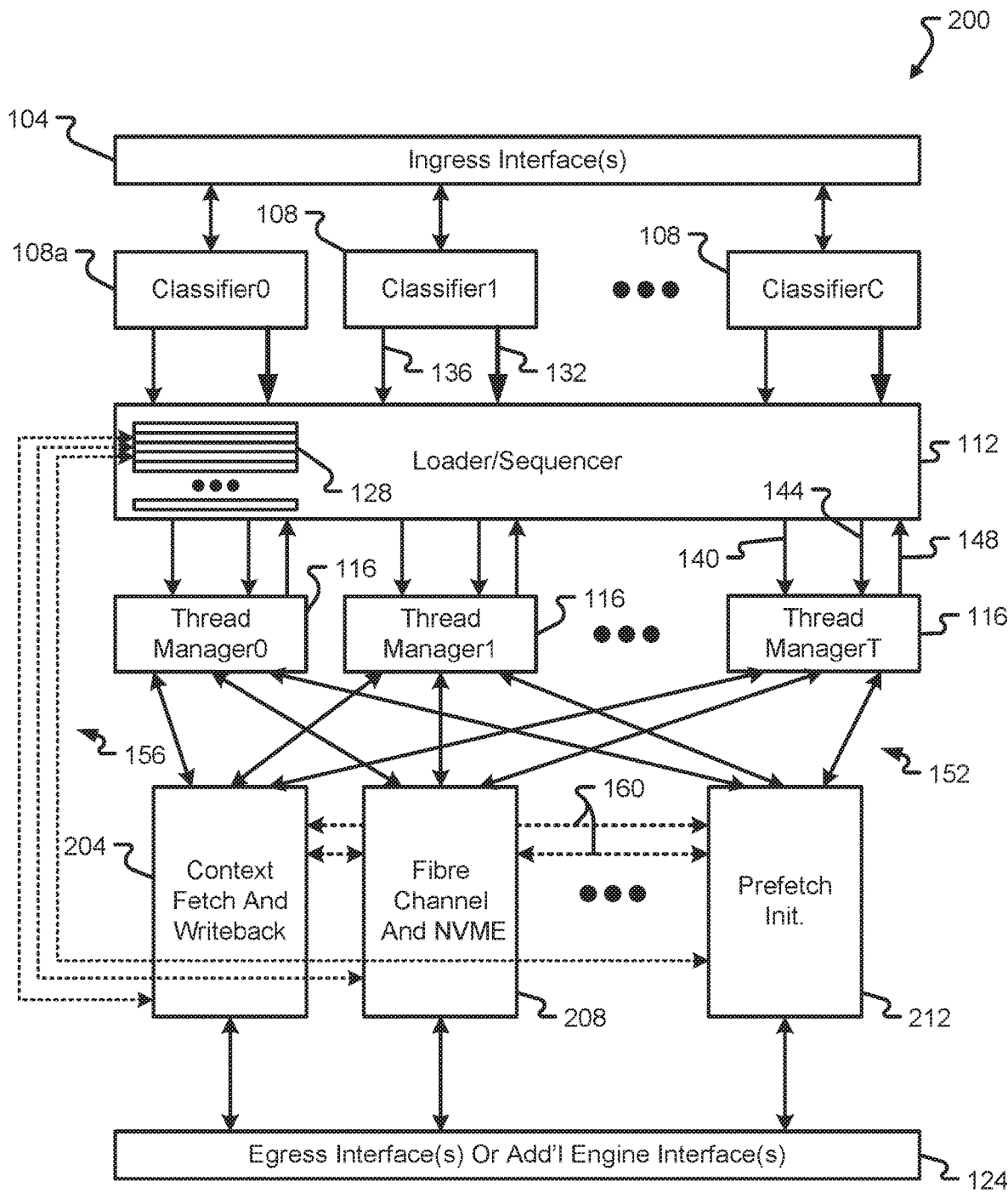
FIG. 2 is a block diagram depicting a second data transmission system in accordance with at least some embodiments of the present disclosure.

FIG. 2 depicts a more specific but non-limiting example of the manner in which the system 100 may be implemented. Specifically, FIG. 2 depicts a system 200 where the processing engines are implemented as a context fetch and writeback engine 204, a Fibre Channel and NVMe engine 208, and a prefetch initiator engine 212. The context fetch and writeback engine 204 may correspond to a processing engine 120 specifically configured to perform context fetching and writeback tasks. The Fibre Channel and NVMe engine 208 may include components that enable the engine 208 to perform data lookups or other I/O commands over a Fibre Channel connection with a storage or non-volatile memory device. The prefetch initiator engine 212 may be configured to perform prefetch tasks and/or initiate the performance of prefetch tasks in other processors/engines.

Figure 3:
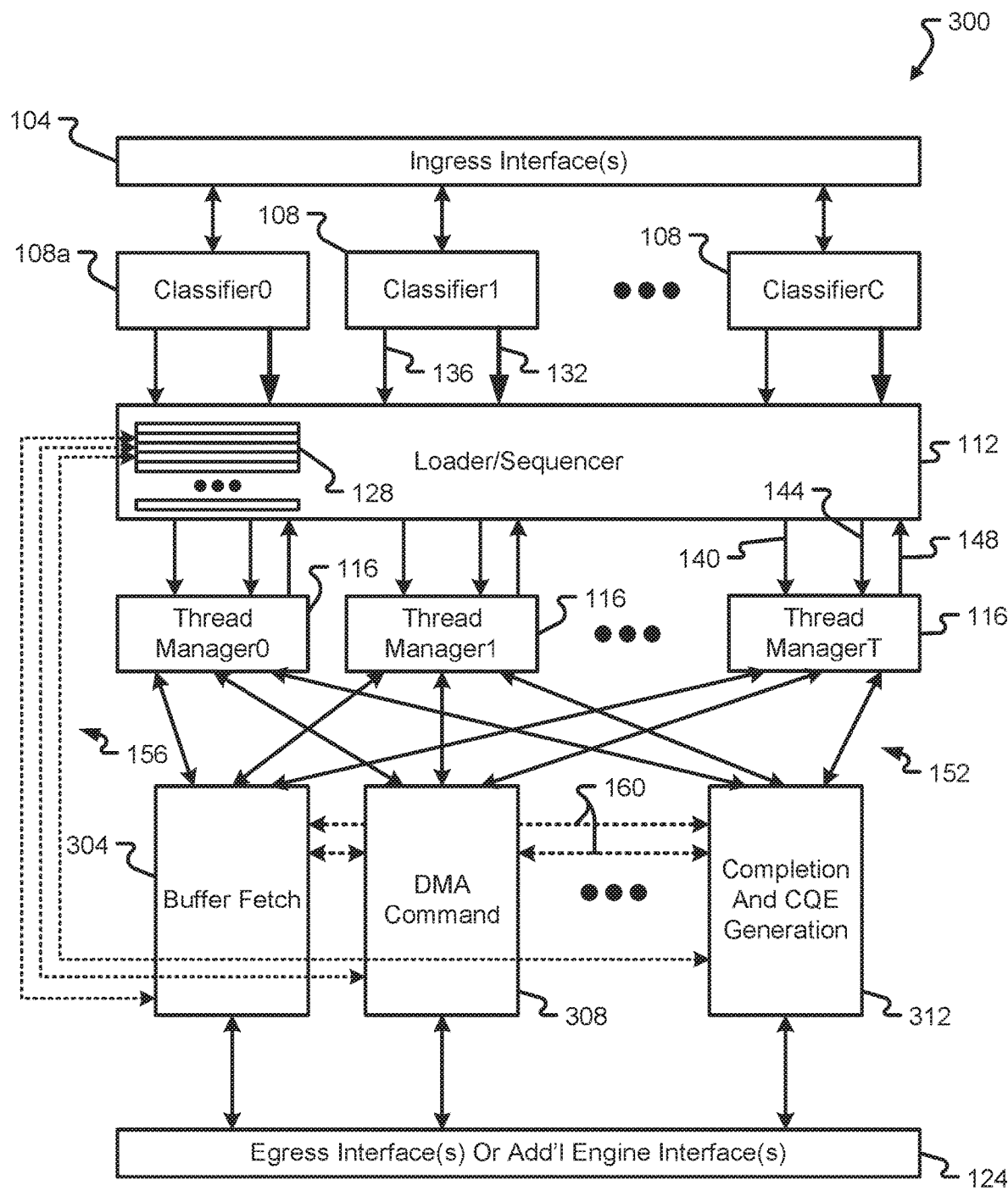
FIG. 3 is a block diagram depicting a third data transmission system in accordance with at least some embodiments of the present disclosure.

FIG. 3 depicts another specific but non-limiting example implementation of system 100. In this example, FIG. 3 shows a system 300 where the processing engines are provided as a buffer fetch engine 304, a Direct Memory Access (DMA) command engine 308, and a completion and CQE generation engine 312. The buffer fetch engine 304 may include components that are used to fetch data from buffer memory. The DMA command engine 308 may include components and logic that enable DMA functions to be performed. The completion and CQE generation engine 312 may perform final I/O completion tasks and other final processing steps associated with an I/O command.

Figure 4:
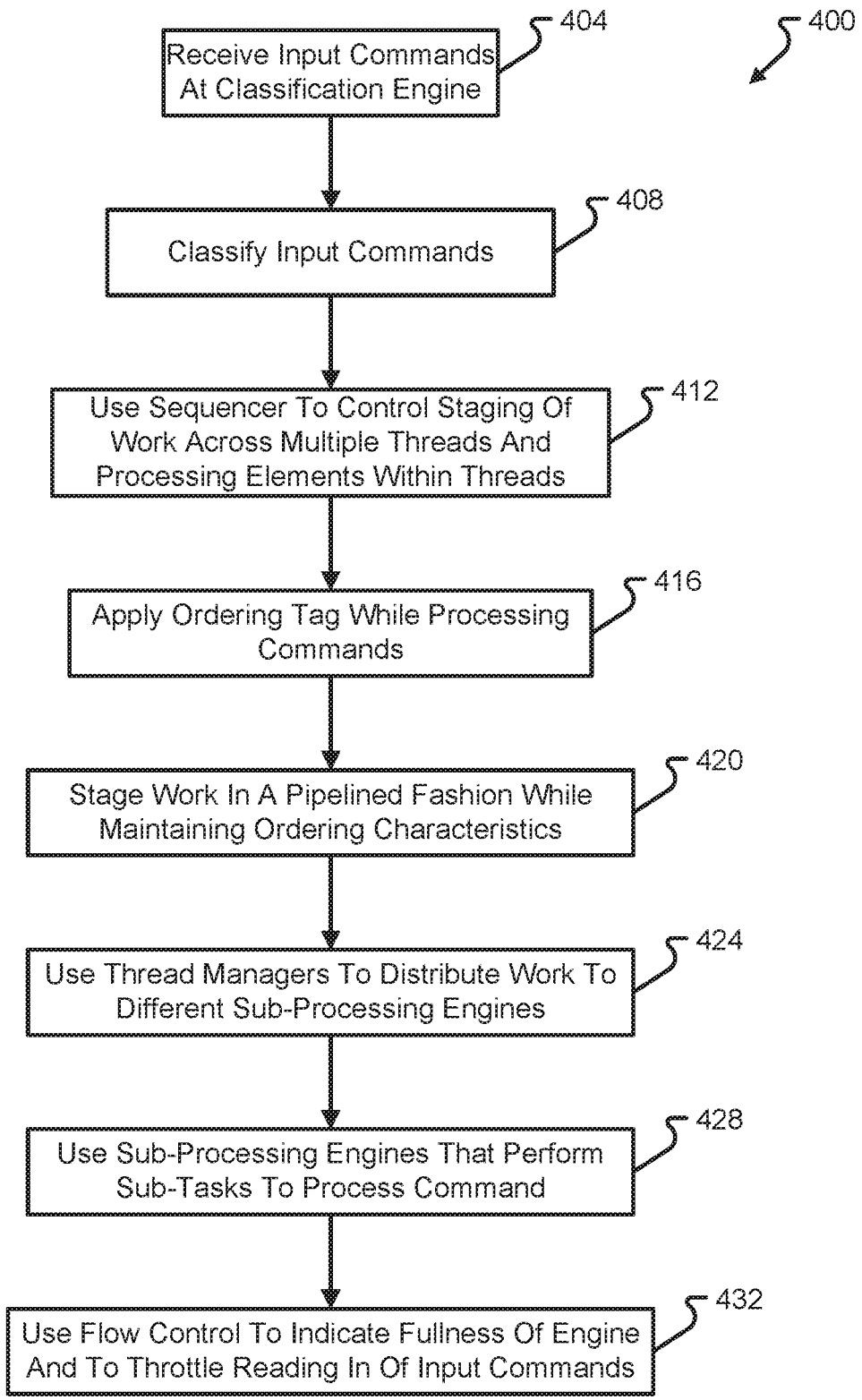
FIG. 4 is a flow diagram depicting a method of processing input commands in accordance with at least some embodiments of the present disclosure.

With reference now to FIG. 4, a method 400 of operating a system 100 will be described in accordance with at least some embodiments of the present disclosure. The method 400 begins when one or more input commands are received at an ingress interface 104 and fed to a classification engine or classifier 108 (step 404). The classification engine or classifier 108 is used to classify the received input commands and generate one or more descriptors that represent the classification applied to the input commands (step 408).

The method 400 continues with the classification engine or classifier 108 providing the commands to a sequencer 112 along with the one or more descriptors associated therewith. The sequencer 112 uses the one or more descriptors to control staging of work across one or multiple threads 116 and processing elements within those threads (step 412). The sequencer 112 is able to apply ordering tag(s) while processing the command(s) (step 416) and stage work in a pipelined fashion while maintaining the ordering characteristics (step 420).

The sequencer 112 can use the thread managers 116 to distribute the work associated with a particular command among a plurality of different sub-processing engines 120 (step 424). The sub-processing engines 120 are used to perform the sub-tasks or work associated with the command (step 428). In some embodiments, a flow control mechanism can be used to indicate a fullness of the sub-processing engines 120 and to throttle the reading in of additional input commands at the ingress interface (step 432). Once all of the work associated with a particular command has been performed, the sub-processing engines 120 may generate one or more outputs for transmission via the egress interface(s) and/or via an additional engine interface 124.

Multi-Engine Protocol Offload

With reference now to FIGS. 5-10, additional details of a multi-engine protocol offload will be described in accordance with at least some embodiments of the present disclosure. In particular, and with initial reference to FIG. 5, a system 500 is shown that facilitates communications between a host device (e.g., via PCIe) and a communication network (e.g., via Fibre Channel). Although the communication network is shown to use Fibre Channel as the communication protocol, it should be appreciated that other communication protocols such as Ethernet may be used on the communication network-side of the system 500.

Figure 5:
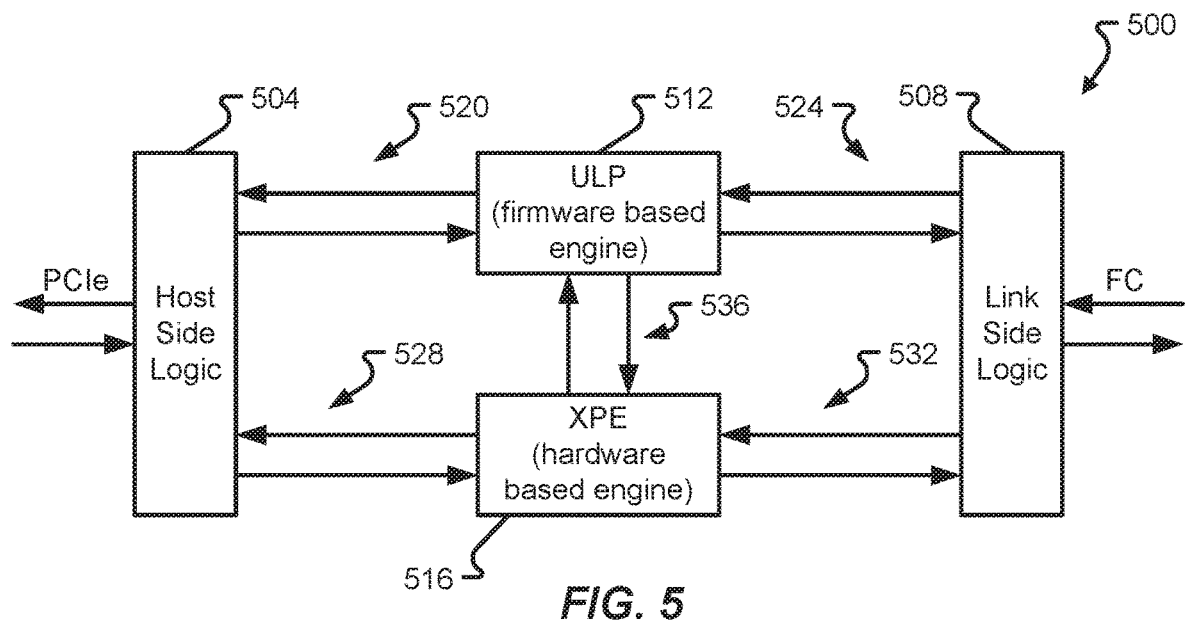
FIG. 5 is a block diagram depicting a multi-engine protocol architecture in accordance with at least some embodiments of the present disclosure.
Figure 6:
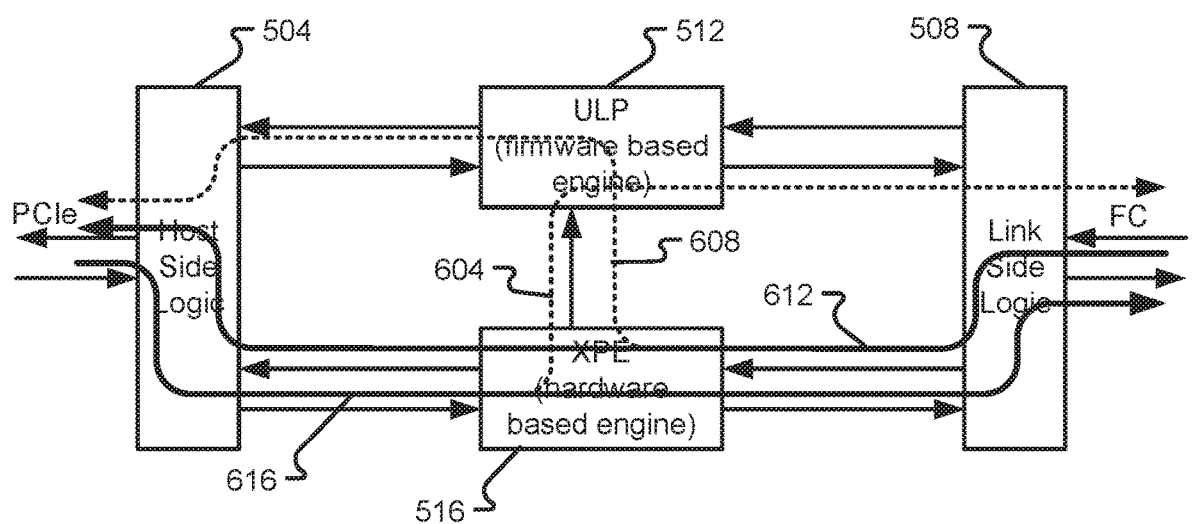
FIG. 6 illustrates the architecture of FIG. 5 in a first mode of operation in accordance with at least some embodiments of the present disclosure.

FIG. 5 further depicts two processing engines 512, 516 positioned in parallel with one another between the host side logic 504 and link side logic 508. As can be appreciated, each engine 512, 516 may contain some or all of the components of the systems, 100, 200, 300 previously described in connection with FIGS. 1-4. For instance, one or more systems 100 may be provided as part of a firmware-based processing engine (Upper Layer Protocol engine or ULP) 512. Similarly, one or more systems 100 may be provided as part of a hardware-based processing engine (Xccelerated Protocol Engine or XPE) 516. As a more specific, but non-limiting example, some or all of the components of the system 100 may be used to facilitate the processing commands between host side logic 504 and link side logic 508. The components of system 100 may be configured as shown in FIG. 1 or have a different configuration to facilitate the processing requirements of the ULP 512 and/or XPE 516.

Embodiments of the present disclosure incorporate the XPE 516 in addition to the existing ULPs 512 instead of boosting up the ULP clock frequency and/or count. This architecture provides better performance with lower I/O latency, higher I/O Operations Per Second (IOPs), and throughput as well as a better power envelope while preserving protocol processing flexibility.

The system 500 and other systems depicted and described herein can be used for accelerating Fibre Channel and NVMe protocol processing. This is accomplished by leveraging the hardware-based engine (XPE) 516 and the firmware-based engine (ULP) 512 to maximize performance (with higher IOPs and throughput as well as lower storage I/O latency) while preserving protocol processing flexibility. Although the examples described and illustrated herein are shown to work in conjunction with Fibre Channel and NVMe, it should be understood that embodiments of this disclosure are not so limited. For instance, the system 500 may be applied in the context of many other protocols such as TCP/IP, iSCSI and RDMA.

FIG. 5 also shows the communication pathways between the various components 504, 508, 512, and 516. In particular, communication links 520 and 524 are shown to connect the ULP 512 directly to the host side logic 504 and link side logic 508. Similarly, communication links 528 and 532 are shown to connect the XPE 516 directly to the host side logic 504 and link side logic 508. An inter-engine connection 536 is also shown to provide a direct communication pathway between the ULP 512 and XPE 516. It should be appreciated that if the system 500 were expanded to include more than two processing engines, then additional inter-engine connections 536 may be provided for each unique pair of processing engines.

A multi-engine protocol offload provides a good balance of accelerating protocol processing, reducing power, and providing flexibility. Operating with multiple protocol engines (XPE-hardware based and ULP-firmware based) will maximize throughput with low latency for small and medium sized I/O commands and provide the ability to support a large number of outstanding I/O commands that are large in size (e.g., in a Mega-Byte range).

In some embodiments, the XPE 516 is optimized for low latency, high IOPs and high throughput for small or medium sized I/O commands. In contrast, the ULP 512 is tailored towards larger I/O commands with non-blocking support. The ULP 512 is configured to perform protocol error handling and it has the flexibility to handle new protocol support/update and version changes in protocol specifications. In addition, the ULP 512 is capable of implementing workarounds for hardware as necessary. Operating the ULP 512 in conjunction with the XPE 516, the ULP 512 processor count can be reduced to save power since the performance requirement for ULP 512 has decreased.

In accordance with at least some embodiments, the XPE 516 has the ability to hand-over and forward specific frame types to ULP 512 for protocol processing as necessary, this hand-over can be achieved using paths 604, 608 which flow through the inter-engine connection 536. This mode of operation may be referred to as an I/O Phase Pipeline mode of operation and is shown in particular in FIG. 6. In this mode of operation, a HW_OWNED bit can be implemented in the protocol exchange context to indicate that the XPE 516 owns the protocol exchange context and it is responsible for processing frames associated with the I/O exchange. The XPE 516 can be programmed to clear the HW_OWNED bit to pass the ownership of an I/O exchange to ULP 512 after a frame is forwarded to ULP 512 for processing. Any frame that isn't forwarded to the ULP 512 may be processed directly by the XPE 516 and carried over paths 612 and/or 616. There are a number of different use cases for forwarding frames to ULPs 512.

An out of transmit buffer condition may occur when the system 500 is processing a large number of processes (e.g., XFR_RDYs) with large burst lengths received from a Fibre Channel link 508 (e.g., to pull I/O data out of an Initiator host to wire). During this condition, the XPE 516 may forward unprocessed XFR_RDYs to the ULP 512 for queuing and processing via paths 604 and 608. For example, one XFR_RDY with burst length of 1 MB (requesting for 1 MB of data) may result in 512 2 KB frames being transmitted. What this means is that the transmit path 612 can be tied-up for a long period of time for transmitting 512 frames. New XFR_RDYs that are received and processed for FCP_DATA transmission will be queued-up in the transmit descriptor queue, which is designed for staging purposes (deep enough to maximize performance without a large memory buffer to save power) and not queuing-up all initiator write I/O commands that are inflight. The ULP 512 may be provided with a block list mechanism designed to queue-up all XFR_RDYs received without blocking.

In another use case, errant frames can be forwarded via path 604 and/or 608 to the ULP 512 for processing after a HW_OWNED bit is cleared to 0 in a protocol exchange context via the inter-engine connection 536. The XPE 516 can forward frames to ULP 512 based on frame contents (e.g., R_CTL, TYPE, F_CTL, SCSI_ID and so on). Frame content mask and matching are programmable.

In some embodiments, a pipeline mode may be utilized with a divide and conquer scheme whereby the XPE 516 and ULP 512 operate in different I/O phases (e.g., CMD, XFR_RDY, DATA, RSP, etc.) of an exchange while providing protocol exchange context coherency with a HW_OWNED mechanism (again via path(s) 604, 608). There are two illustrative pipeline methods: protocol engine pipeline mode and I/O phase pipeline mode.

Figure 7:
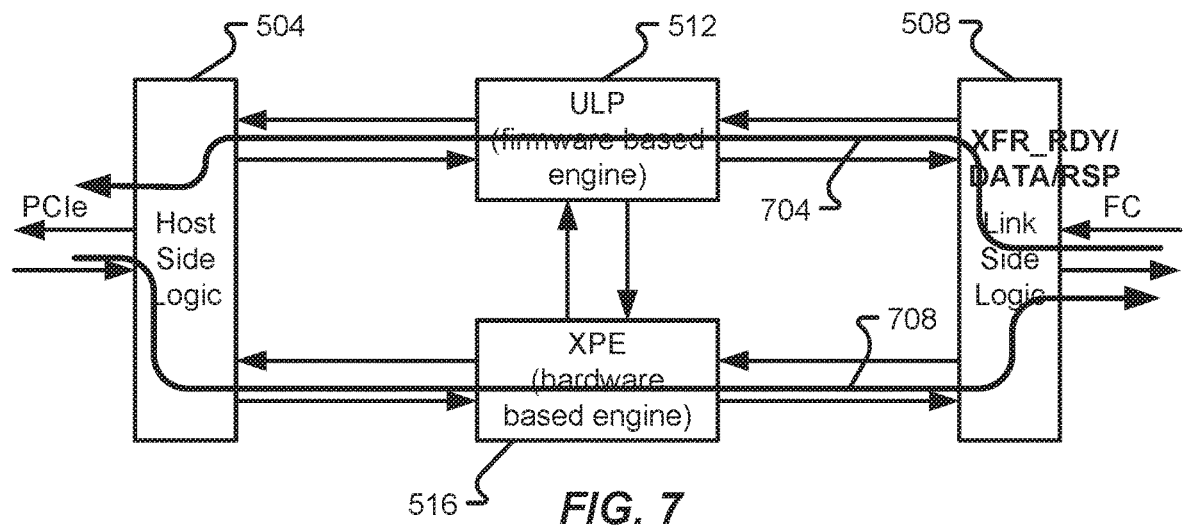
FIG. 7 illustrates the architecture of FIG. 5 in a second mode of operation in accordance with at least some embodiments of the present disclosure.

In the protocol engine pipeline mode, a Work Queue Element (WQE) (offload for Tx WQE processing) in the XPE 516 can be on or off dictated by a work queue profile configuration. Details of such a configuration are shown in FIG. 7 where a protocol engine pipeline mode is implemented with the XPE 516 operating on transmission pathway 708 processing whereas the ULP 512 operates on receive pathway 704 processing.

Figure 8:
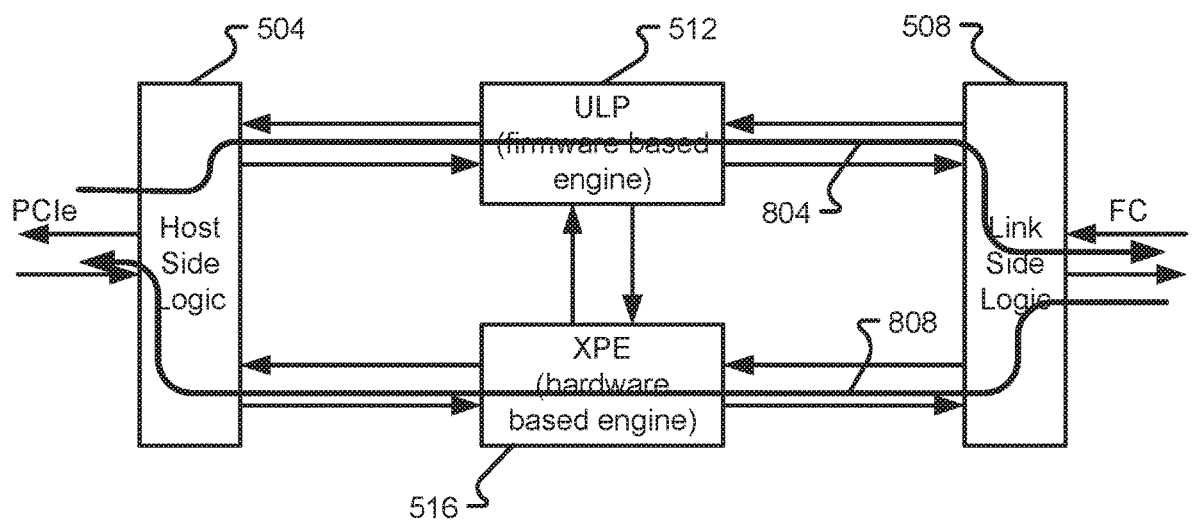
FIG. 8 illustrates the architecture of FIG. 5 in a third mode of operation in accordance with at least some embodiments of the present disclosure.

In an XPE 516 receive protocol engine offload (for receive frame processing), the XPE 516 processing routines can be directed by a receive routing table where the ULP 512 operates on the transmit pathway 804 processing. In this mode, the XPE 516 operates on the receive pathway 808 processing. Details of this particular system configuration are shown in FIG. 8.

Referring back to FIG. 6, in the I/O phase pipeline mode, the dashed lines show the paths 604, 608 when the XPE 516 processing is off (commands or frames being forwarded from XPE 516 to ULP 512) for particular I/O phases). Examples of such phases include, without limitation:
  FCP_CMD phase: On or Off (via WQE feature mask and match)
  FCP_XFR_RDY phase: On or Off (via frame content mask/match or the HW_OWNED bit)
  FCP_DATA phase: On or Off (via frame content mask/match or the HW_OWNED bit)
  FCP_RSP phase: On or Off (via frame content mask/match or the HW_OWNED bit)

Figure 9:
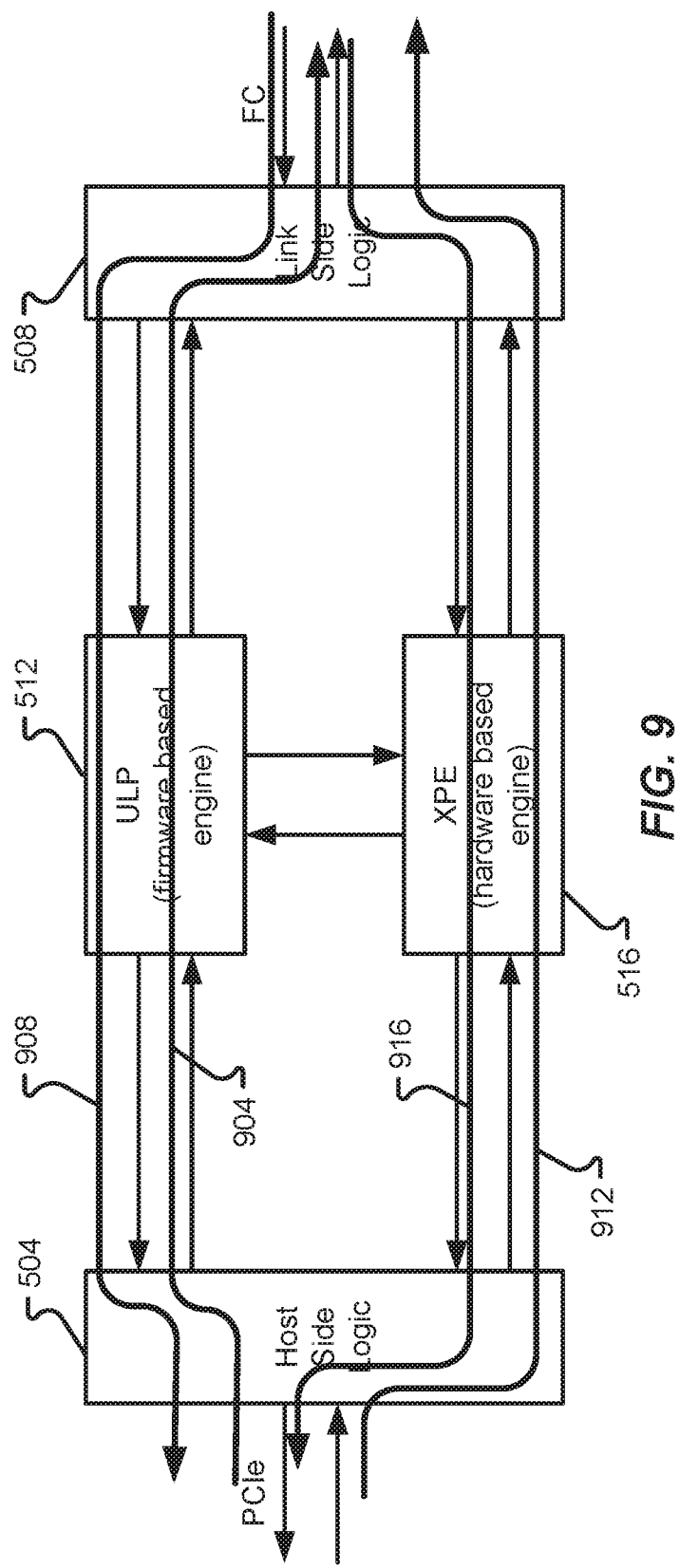
FIG. 9 illustrates the architecture of FIG. 5 in a fourth mode of operation in accordance with at least some embodiments of the present disclosure.

Still another possible mode of operation corresponds to a protocol engine concurrent mode of operations where the ULP 512 and XPE 516 are simultaneously operated and where I/O commands are dispatched to different Work Queues (WQs) to divide work between the XPE 516 and ULP 512. In some embodiments, the XPE WQs can be used for high IOPs and low latency operations, especially with NVMe commands. On the other hand, ULP WQs can be used for bulk data transfers with large I/O sizes. In this mode, as shown in FIG. 9, both the ULP 512 and XPE 516 may have two pathways 904/908 and 912/916, respectively, flowing through them. In some embodiments, this mode of operation may be maintained and intelligent decisions as to which pathway 904, 908, 912, or 916 to use can be based on logic applied at the host side logic 504 (e.g., for pathways 904 or 912) or the link side logic 508 (e.g., for pathways 908 or 916).

Figure 10:
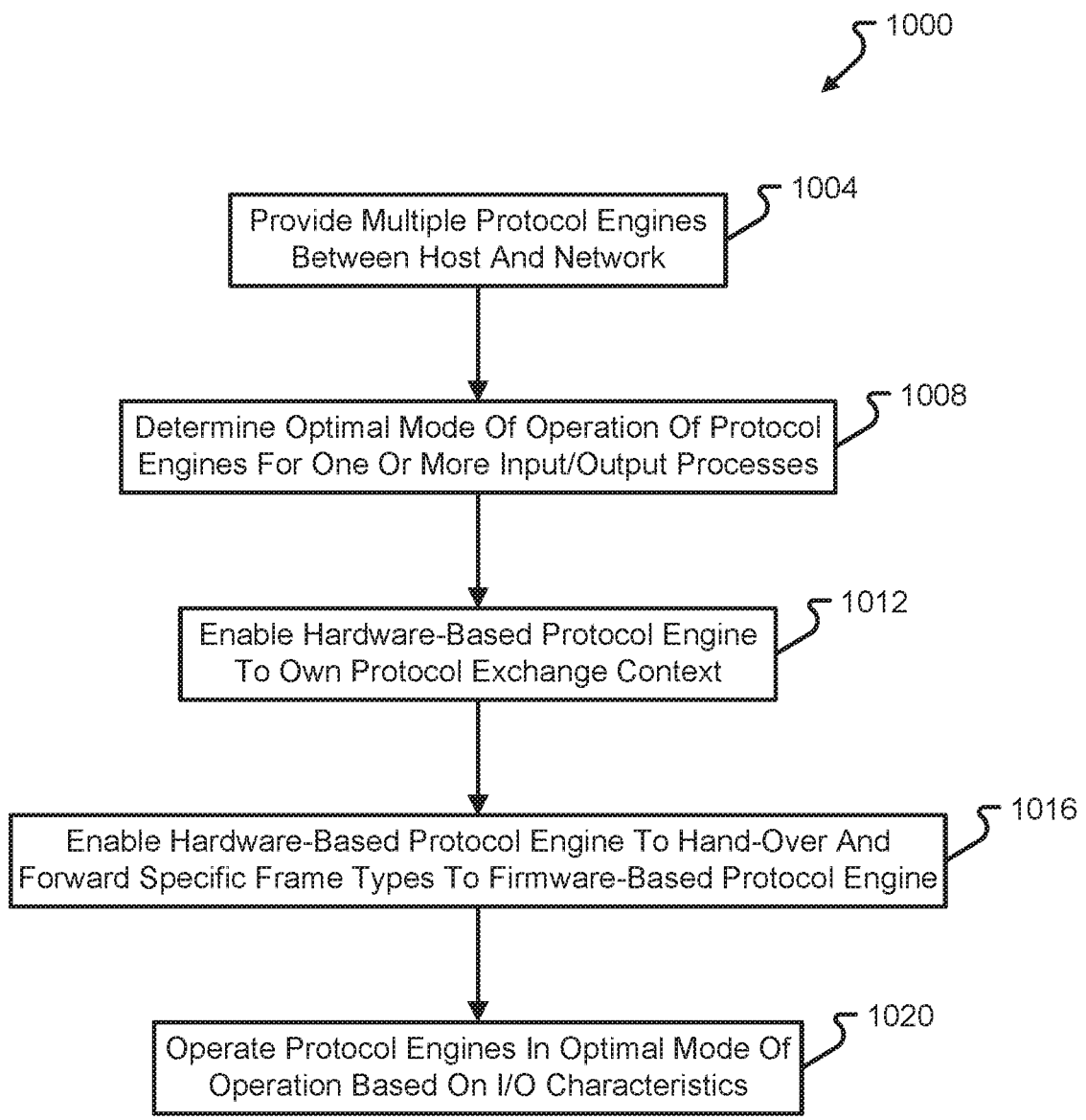
FIG. 10 is a flow diagram depicting a method of operating a multi-engine protocol architecture in accordance with at least some embodiments of the present disclosure.

With reference now to FIG. 10, additional details of a method 1000 for operating the system 500 will be described in accordance with at least some embodiments of the present disclosure. The method 1000 begins by providing multiple protocol engines between a host and network (step 1004). As can be appreciated, the multiple protocol engines may at least include one ULP 512 and one XPE 516, which are connected in parallel with one another, but also share an inter-engine connection between one another.

The method 1000 continues by determining an optimal mode of operation of the protocol engines for one or more I/O processes received at the host side logic 504 and/or link side logic 508 (step 1008). This determination of an optimal mode of operation may include applying logic within the XPE 516, applying the host side logic 504, applying the link side logic 508, and/or having a system administrator provide some logic or operational rules to the system 500.

The method 1000 then continues by enabling the hardware-based protocol engine XPE 516 to own a protocol exchange context for I/O commands being processed by the system 500 (step 1012). The method 1000 may also include enabling the XPE 516 to hand-over and forward specific frame types to the firmware-based protocol engine ULP 512 (step 1016). In some embodiments, the hand-over is achieved by use of a HW_OWNED bit and by use of an inter-engine connection 536.

The protocol engines are then allowed to operate in the determined optimal mode of operation based on the I/O characteristics of frames received at the host side and/or network side (step 1020).

Programmability in Processing Engines

Figure 11:
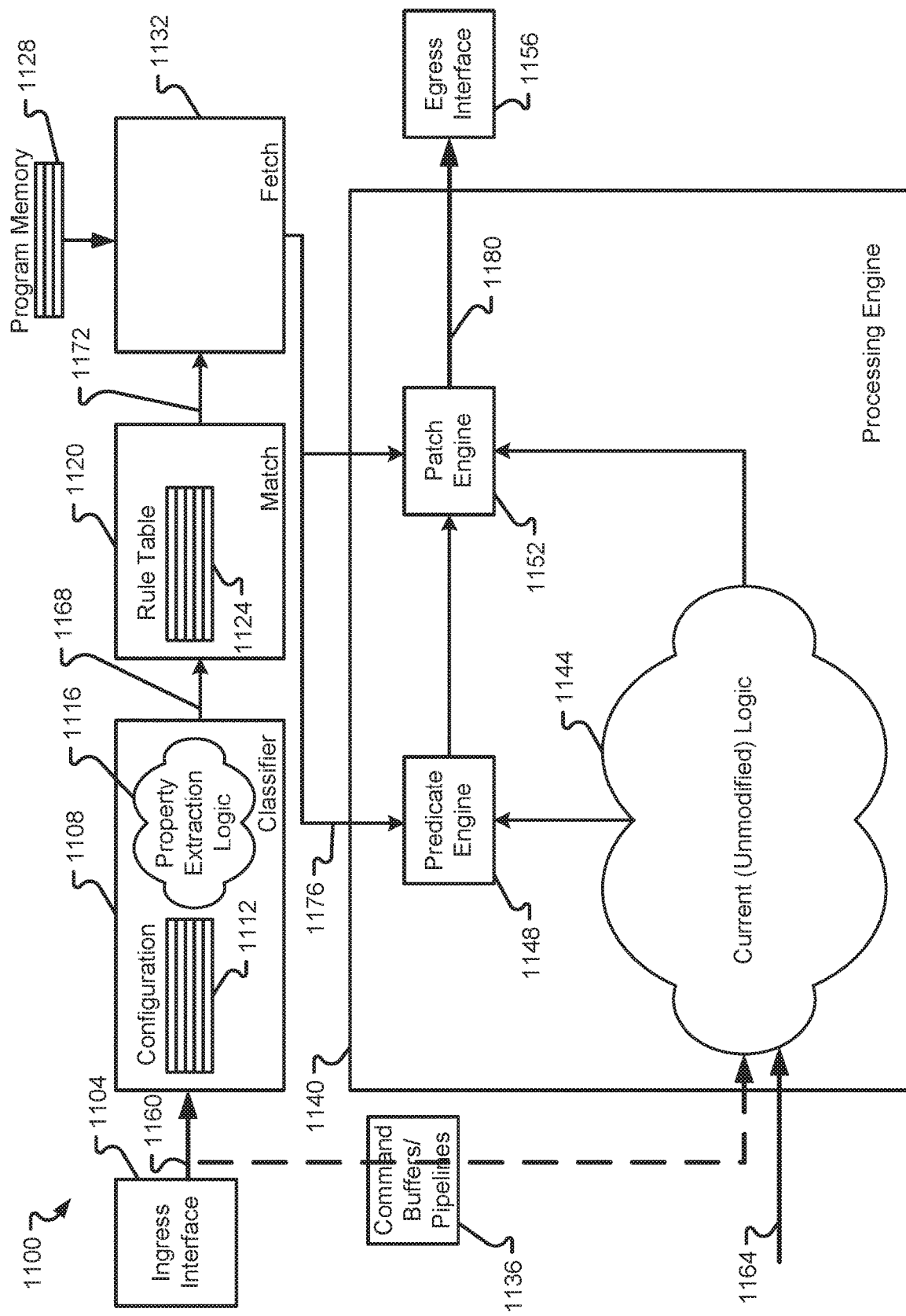
FIG. 11 is a block diagram depicting an illustrative programmable processing engine in accordance with at least some embodiments of the present disclosure.
Figure 12:
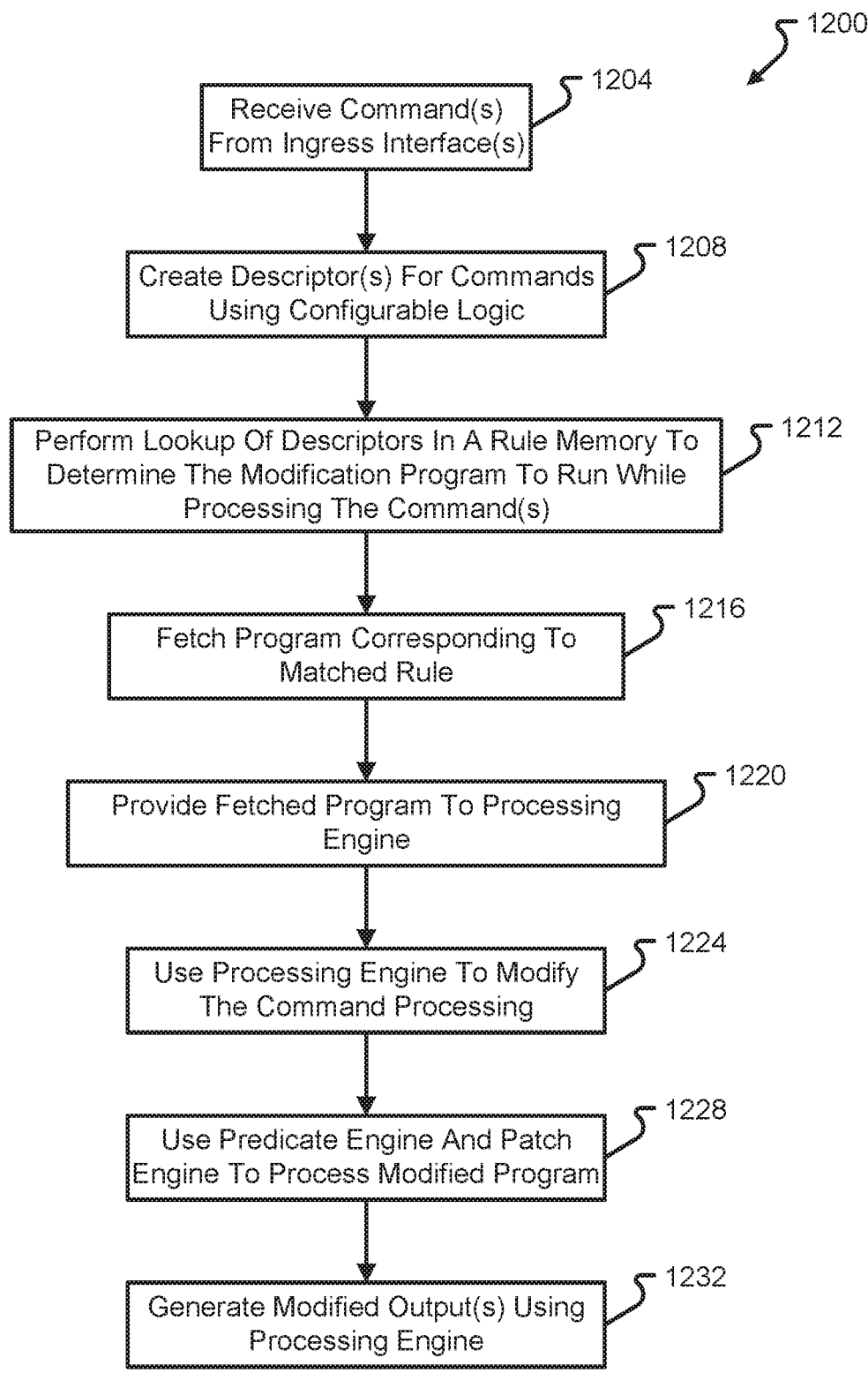
FIG. 12 is a flow diagram depicting a method of operating a programmable processing engine in accordance with at least some embodiments of the present disclosure.

With reference now to FIGS. 11 and 12, details of enabling programmability for processing engines 120, 512, 516 will be described in accordance with at least some embodiments of the present disclosure. The illustrative processing engine 1140 shown in FIG. 11 may correspond to any one or combination of processing engines previously depicted and described herein. As shown in FIG. 11, the processing engine 1140 may be provided within a larger system 1100.

The system 1100 may be configured to provide flexibility in ASIC processing functions by programming a set of instructions that can change the results of the functions. This approach makes the functions pliant to requirement changes, allows fixes for design issues, and/or allows partial processing of inputs in case a software assist is desired.

Since manufacturing a modern ASIC is a significant investment, such flexibility helps reduce risk in the investment. The system 1100 effectively enables an apparatus to provide flexibility in an otherwise hardcoded, complex, command processing engine 1140, where a command could be any set of bits being transformed by the processing engine 1140 (into another set of bits).

The system 1100 may enable the processing engine 1140 to receive commands from the ingress interface 1104 and then create descriptors using configurable logic in the classifier 1108. These descriptors may then be looked up in a rule table 1124 maintained by a matching engine 1120, which determines the modification program for the processing engine 1140 to run while processing the command. The modification program 1128 is then applied at a patch engine 1152 to existing logic 1144 and modifies the processing result in desirable ways.

In some embodiments, the processing engine 1140 is provided between an ingress interface 1104 and egress interface 1156. As can be appreciated, the ingress interface 1104 may be similar or identical to ingress interface 104. Likewise, the egress interface 1156 may be similar or identical to egress interface 124. System 1100 is also shown to include one or more classifiers 1108 (which may be similar or identical to a classifier 108), one or more matching engines 1120 (which may have functionality similar or identical to the loader/sequencer 112), and a fetch engine 1132 (which may be similar or identical to the context fetch and writeback engine 204 or the buffer fetch engine 304).

System 1100 is further shown to include command buffers or pipelines 1136, which may be similar or identical to command storage area 128. Additionally, system 1100 is shown to include a predicate engine 1148 and patch engine 1152 in the processing engine 1140. As will be discussed in further detail herein, the predicate engine 1148 and patch engine 1152 may be used to help facilitate performant programmability in the processing engine 1140. The ingress interface 1104 is shown to provide an output 1160 in the form of I/O commands to both the classifier 1108 and processing engine 1140. The processing engine 1140 may receive the I/O commands output 1160 by the ingress interface 1104 via the buffers 1136 whereas the classifier 1108 receives the commands directly from the ingress interface 1104. Current or unmodified logic 1144 of the processing engine 1140 may receive the commands from the ingress interface 1104 and further receive other context specific inputs 1164 from other sources.

Meanwhile, the classifier 1108 may be configured to parse input commands. Programmable logic circuits that extract properties 1116 of the input command may be provided within the classifier 1108. Examples of such property extraction logic include, without limitation, mask/match logic, comparators and other complex functions. The classification result 1168 is provided to downstream blocks in a descriptor.

Non-limiting examples of input commands and some classifier functions include: a Frame Header, a Frame Payload, a WQE descriptor, and an Internal or External Completion descriptor. As an example, a Frame Header may include Mask/Match configuration flops 1112 to match Frame Type, Control Flags, Src or Dest Addresses. Alternatively or additionally, a Frame Header may include a Range Config 1112 to match Frame/Payload Length being within a range, or Src/Dest Addresses being within a range.

As some examples, a Frame Payload may include Mask/Match Config flops 1112 to match Payload Type, Control Flags, Src or Dest Addresses in Payload (ULP). Alternatively or additionally, a Frame Payload may include a Range Config 1112 to match Frame/Payload Length being within a range, or Src/Dest Addresses being within a range in Payload (ULP)

As some examples, a WQE descriptor may include Mask/Match Config flops 1112, to match WQE Type, Control Flags, Src or Dest Addresses. Alternatively or additionally, the WQE descriptor may include a Range Config 1112 to match Transfer Length being within a range, or Src/Dest Addresses being within a range.

An Internal or External Completion descriptor may include Mask/Match Config flops 1112, to match WQE Type, Control Flags, Src or Dest Addresses. Alternatively or additionally, the Internal or External Completion descriptor may include a Range Config 1112 to match Transfer Length being within a range, or Src/Dest Addresses being within a range.

The classifier descriptor 1168 generated at the classifier 1108 is communicated to the match engine 1120, to facilitate a rule lookup process. In some embodiments, the match engine 1120 utilizes an internal rule table 1124 (which may be programmable in some embodiments) to look up the classifier descriptor 1168 in the rule table 1124. A match in the rule table 1124 may provide a pointer 1172 into program memory 1128, which ultimately determines which program to run at the processing engine 1140. In accordance with at least some embodiments, a program that is ultimately retrieved from program memory 1128 by a fetch engine 1132 may correspond to a set of one or more configurable instructions that define how command processing should be modified.

As noted above, the program corresponding to the matched rule is fetched from program memory 1128 (or some other relevant data structure) and provided to the processing engine 1140. Depending on performance requirements, the program can be fetched and provided to the processing engine 1140 over a single clock cycle or over multiple clock cycles.

The processing engine 1140 contains logic 1144 that looks at the input command 1160 and other contextual information 1164 needed to process the command. The processing engine 1140 is configured to perform a set of well-defined, hard-wired operations. In some embodiments, the processing engine 1140 is modified to read in instructions 1176 from the fetched program. Instructions 1176 can contain opcodes, the signal(s) to modify, and immediate data. The program may correspond to one of two types of instructions: predicates and patches.

The predicate instructions may be applied by a predicate engine 1148. In some embodiments, predicates, when applied to an input, return a true/false result. Patches, on the other hand, may be applied by the patch engine 1152. Patch instructions, as compared to predicate instructions, modify inputs and/or output results 1180. In some embodiments, the application of patch instructions can be predicated upon a condition defined by the predicate instructions. That is, the result of a predicate instruction, if TRUE, allows an associated set of patch instruction to be applied to an input or output result. The association between the patch and predicate instructions is implementation dependent and can be used to construct complex programs.

Each instruction in a program (predicate or patch) can specify one or more of: an opcode, an input signal(s) to operate on, immediate data, and resulting outputs. The program instructions can be fetched and applied over zero (e.g., in parallel to existing processing) or more clock cycles, depending on performance goals. In one embodiment, the entire program is presented to the processing engine 1140 over a couple of clock cycles, keeping the processing engine nearly as fast as the original (less flexible) design.

Some possible use cases for this system include, without limitation:
  Ignore certain errors while processing commands.
  Perform actions on commands where fields (e.g. length) are within a certain range.
  Flag combinations of input command signals as errors.
  Redirect input commands to other engines for partial or complete processing.
  Modify how contexts and other data structures are initialized or updated.
  Modify pre-fetching of data structures. For example, buffer pointers could be pre-fetched at the beginning of a new connection, or at the end of a terminating connection. These decisions have different performance implications, and either method may be advantageous for different applications in the field.
  Change descriptors sent out to other blocks.
  Enable additional processing to happen (or not). For example,
    Initializing other engines
    Activating dormant/spare logic in the processing path
    Disabling active logic from the processing path.

In an example implementation, the instruction set can include the following, where var is the output signal that needs to be modified and immdt is an immediate data value used to modify var. In some embodiments, instructions may be a rich set of modifications that are implementation dependent. For high performance designs, multiple instructions can be concatenated to form a large instruction vector allowing parallel fetch and execution of multiple instructions.

Non-limiting examples of patch instructions include:
  NOP(var, immdt): var is unmodified.
  SET(var, immdt): Set var=immdt
  OR(var, immdt): Set var=var|immdt
  AND(var, immdt): Set var=var & immdt
  XOR(var, immdt): Set var=var immdt
  N_AND(var, immdt): Set var=var & immdt
  N_OR(var, immdt): Set var=var|immdt
  N_XOR(var, immdt): Set var=var ˆ immdt
  HASH_n(var1, var2): Set var[n−1:0]=hash(var2)
  Non-limiting examples of predicate instructions include:
  EQ_P(var, immdt): True if var==immdt
  NE_P(var, immdt): True if var!=immdt
  GT_P(var, immdt): True if var>immdt
  GE_P(var, immdt): True if var>=immdt
  LT_P(var, immdt): True if var<immdt
  LE_P(var, immdt): True if var<=immdt
  MASK_MATCH_P(var, mask, match): True if var & mask==match & mask
  AND_P(pred0, pred1, . . . ): True if all of pred0, pred1, . . . are true. Can be used to chain predicates.
  OR_P(pred0, pred1, . . . ): True if any of pred0, pred1, . . . are true. Can be used to chain predicates.

It should be appreciated that the application of predicate and/or patch instructions at the processing engine 1140 can help the processing engine 1140 provide more flexible outputs 1180 based on input commands 1136 received via the ingress interface 1104. In particular, the processing engine 1140 can be configured to adapt to a set of changes in functional requirements even after manufacture. Moreover, design bugs discovered in the field can be fixed by application of embodiments of the present disclosure. Furthermore, the overall investment risk in ASIC manufacturing can be lowered.

With reference now to FIG. 12, a method 1200 of operating the system 1100 will be described in accordance with at least some embodiments of the present disclosure. The method 1200 begins when an input command is received at an ingress interface 1104 and then forwarded to a classifier 1108 (step 1204). The classifier 1108 continues by using its property extraction logic 1116 and configuration logic 112 to create one or more descriptors for the input command(s) (step 1208).

The classifier 1108 provides the one or more descriptors to a matching engine 1120, which performs a lookup of descriptors in its rule table 1124 to determine a modification program to run while processing the command 1160—if any modification program is to be run (step 1212). Thereafter, the matching engine 1120 provides one or more pointers 1172 to the fetch engine 1132. The fetch engine 1132 fetches the appropriate program(s) from memory 1128 (step 1216). The fetched program(s) are then provided to the processing engine 1140 (step 1220). In some embodiments, the fetched program(s) can be provided to one or both of the predicate engine 1148 and patch engine 1152.

Meanwhile, the processing engine 1140 receives the input command 1160 via the command buffers 1136 and applies the unmodified logic 1144 to one or both of the predicate engine 1148 and patch engine 1152. Application of the predicate engine 1148 and/or patch engine 1152 facilitates the modification of the original program within the processing engine (steps 1124 and 1128). The processing engine 1140 then generates one or more modified outputs 1180, which are provided to the egress interface 1156 (step 1232).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A command processing device, comprising:
   a classification engine circuit configured to classify input commands;
   a sequencer circuit in communication with the classification engine circuit, wherein the sequencer circuit is configured to:
      control staging of work across multiple threads and processing elements within threads; and
      load the input commands into a local memory area and wherein a command read path is provided between one or more sub-processing engine circuits and the sequencer circuit to enable the sequencer circuit to provide the command to one of the one or more sub-processing engine circuits when the input command is assigned to the one of the one or more sub-processing engine circuits;
   one or more thread manager circuits in communication with the sequencer circuit, wherein each of the one or more thread manager circuits is configured to delegate work to different sub-processing engine circuits; and
   the one or more sub-processing engine circuits in communication with each of the one or more thread manager circuits, wherein each of the one or more sub-processing engine circuits is configured to perform sub-tasks in connection with completing processing of an input command received at the classification engine circuit based on particular sub-tasks assigned to the one or more sub-processing engine circuits by the one or more thread manager circuits.

2. The command processing device of claim 1, wherein the classification engine circuit connected to an ingress interface.

3. The command processing device of claim 1, wherein the classification engine circuit parses the input commands and creates descriptors that are provided to the sequencer circuit and then held by the sequencer circuit until the descriptors are passed on to a particular thread manager circuit to which the sequencer circuit assigned work in connection with the input commands.

4. The command processing device of claim 3, wherein the input commands are split up into one or more pipeline stages and wherein for every pipeline stage the sequencer circuit ensures that input commands with a common ordering tag are processed serially.

5. The command processing device of claim 4, wherein ordering and pipelining is enforced by the sequencer circuit with one or more start and done event-pairs that is shared between the sequencer circuit and the one or more thread manager circuits.

6. The command processing device of claim 1, wherein the one or more sub-processing-engine circuits comprise one or more of: a context fetch and write back engine, a Fibre Channel and non-volatile memory express (NVMe) engine, or a prefetch initiator engine.

7. The command processing device of claim 1, wherein the one or more sub-processing engine circuits comprise one or more of: a buffer fetch engine, a Direct Memory Access (DMA) engine, or a completion and completion queue entry (CQE) generation engine.

8. The command processing device of claim 1, further comprising:
   a hardware-based processing engine comprising the one or more sub-processing engine circuits; and
   a firmware-based processing engine, wherein the hardware-based processing engine and firmware-based processing engine are connected in parallel with one another between host side logic and link side logic.

9. The command processing device of claim 8, wherein the hardware-based processing engine and firmware-based processing engine are in direct communication with one another in addition to each being in direct communication with the host side logic and link side logic, and further wherein the direct communication between the hardware-based processing engine and firmware-based processing engine enable delegation of processing tasks.

10. The command processing device of claim 9, wherein a pipeline mode is implemented with the hardware-based processing engine processing transmit frames and the firmware-based processing engine processing receive frames and/or the pipeline mode is implemented with the hardware-based processing engine processing receive frames and the firmware-based processing engine processing transmit frames.

11. The command processing device of claim 8, wherein the hardware-based processing engine is configured to implement programming rules.

12. The command processing device of claim 11, wherein the programming rules utilize the classification of the input commands and retrieve an instruction pointer based on the classification and wherein the instruction pointer provides an indication of predicate and patch instructions to apply to the input commands with a predicate engine and patch engine, respectively, thereby modifying original behavior of the hardware-based processing engine.

13. The command processing device of claim 12, wherein the instruction pointer is retrieved with reference to a rule table stored in memory of a match engine that is in communication with the classification engine circuit.

14. A method of operating a command processing device, comprising:
   classifying input commands with a classification engine;
   controlling staging of work across multiple threads and processing elements within threads with a sequencer that is in communication with the classification engine;
   parsing the input commands and then creating descriptors;
   providing the descriptors to the sequencer;
   enabling the sequencer to hold the descriptors until the descriptors are passed on to a particular thread manager to which the sequencer assigned work in connection with the input commands;
   loading the input commands into a local memory area of the sequencer, wherein a command read path is provided between one or more sub-processing engines and the sequencer to enable the sequencer to provide the command to one of the one or more sub-processing engines when the input command is assigned to the one of the one or more sub-processing engines;
   utilizing one or more thread managers to delegate work to different sub-processing engines in connection with processing the input commands; and
   utilizing the one or more sub-processing engines to perform sub-tasks in connection with processing of the input commands based on particular sub-tasks assigned to the one or more sub-processing engines by the one or more thread managers.

15. The method of claim 14, wherein the one or more sub-processing engines comprise a hardware-based processing engine and a firmware-based processing engine that are connected in parallel with one another and configured to execute different modes of protocol offloading based on a property of the input commands.

16. The method of claim 14, wherein the one or more sub-processing engines comprise a predicate engine and/or patch engine that are configured to modify logic within the one or more sub-processing engines.

17. The method of claim 14, further comprising:
splitting the input commands into one or more pipeline stages, wherein for every pipeline stage the sequencer ensures that input commands with a common ordering tag are processed serially.

18. The command processing device of claim 1, wherein the one or more sub-processing engine circuits comprise one or more of: a context fetch and write back engine, a Fibre Channel and NVMe engine, a prefetch initiator engine, a buffer fetch engine, a Direct Memory Access (DMA) engine, or a completion and CQE generation engine.

19. A system that processes input commands, comprising:
an ingress interface;
an egress interface;
at least one classifier circuit in communication with the ingress interface, wherein the at least one classifier circuit is configured to parse an input command received from the ingress interface and produce a descriptor for the input command based on the parsing of the input command;
a matching engine circuit configured to:
receive the descriptor from the at least one classifier circuit
hold the descriptor until the descriptor is passed on to a particular thread manager to which the matching engine assigned work in connection with the input command;
load the input command into a local memory area of the matching engine circuit, wherein a command read path is provided between one or more processing engine circuits and the matching engine circuit to enable the matching engine circuit to provide the input command to one of the one or more processing engine circuits when the input command is assigned to the one of the one or more processing engine circuits; and
determine an instruction set to retrieve based on the input command assigned to the one of the one or more processing engine circuits; and
the one or more processing engine circuits having at least one of a predicate engine circuit or a patch engine circuit, wherein the processing engine circuit receives the instruction set retrieved and utilizes the at least one of the predicate engine circuit or the patch engine circuit to modify processing logic with the instruction set.

20. The system of claim 19, wherein the at least one classifier circuit is further configured to split the input command into one or more pipeline stages.

* * * * *